Jan. 20, 1931.  W. T. AUBERTIN  1,789,398
MACHINE FOR WORKING WOOD
Filed Nov. 17, 1927
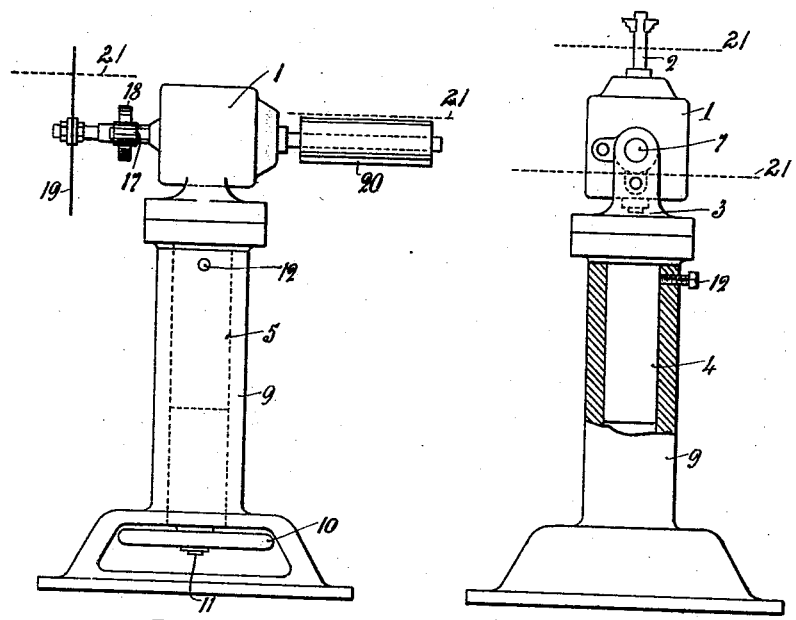
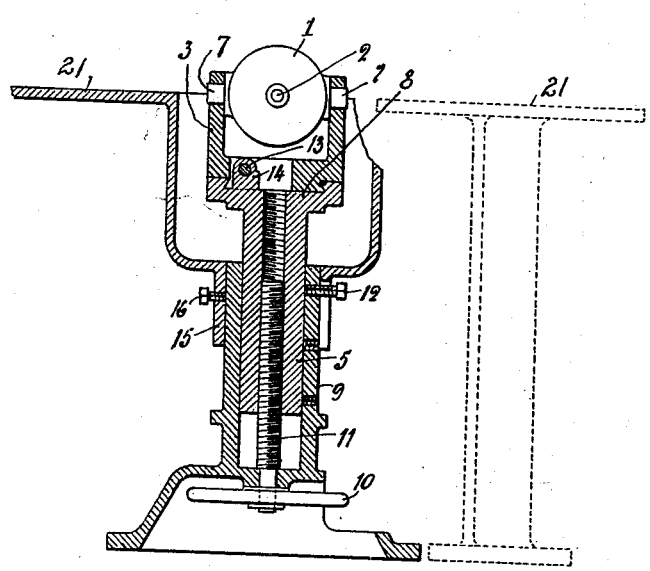

Patented Jan. 20, 1931

1,789,398

UNITED STATES PATENT OFFICE

WILHELM THURE AUBERTIN, OF VALBY, COPENHAGEN, DENMARK

MACHINE FOR WORKING WOOD

Application filed November 17, 1927, Serial No. 234,016, and in Denmark November 18, 1927.

The present invention relates to a machine for working wood.

As contradistinguished from the inventions hitherto known the present invention is characterized by the fact that the body carrying the bearings for the shaft driving the various tools forms a central unit of the machine and that said body not alone can be adjusted in height, but also can be turned about a vertical axis and in every vertical plane can be axially adjusted and further can be turned at every angle in the horizontal plane.

Over the machine an adjustable table for the workpiece can be arranged and in front of every one of the four sides of the machine an adjustable table for the workpiece can be arranged or such a table in form of a circular ring quite surrounding the machine can be arranged and in this way it is possible, when the different tools are attached on the one end or on both ends of the working shaft, with the same machine and partially at the same time to execute all of the common woodworking operations such as cutting, shaping, sawing, planing, boring, grinding, polishing, tenoning, mortising, rabbeting, sanding and the like.

In the accompanying drawing various constructional forms of the machine are shown.

Fig. 1 is a side elevation of a machine embodying one form of the invention and in which adjustments are permitted in a vertical plane.

Fig. 2 is a similar view of another form of the invention, the machine being adjustable in a horizontal plane.

Fig. 3 is a vertical sectional view of still another form of machine which is adjustable both in the vertical and the horizontal plane and the height of table of which can be varied in two ways, namely either by adjusting the bearing body of the machine or the table or both.

As shown in Fig. 1 there is provided a bearing body comprising as shown in the vertical plane a fork 3 having bearings for the trunnions 7 of the motor 1. The fork 3 is attached to a vertical square stud 4 which is adjustable in height in a base 9, and the stud 4 can be fixed in the adjusted position by means of a screw 12. The dotted line 21 indicates the table for the workpiece when the spindle 2 is in its vertical position, but when the spindle 2 of the motor 1 is turned into the horizontal position a table 21 for the workpiece is employed.

In Fig. 2 is shown a similar machine which has a cylindrical stud 5 which is adjustable in height relatively to the table indicated by the dotted line 21 and which can be turned quite round in the horizontal plane.

By this machine two kinds of work can be performed by the same driving shaft or motor, namely on the left sawing with a circular saw 19 driven by a set of gears 17, 18 and on the right surfacing with a surfacer 20.

The machine shown in Fig. 3 shows the rotatability of the bearing body in the horizontal and in the vertical plane besides a corrective adjustment of the tool together with a height adjustment of the table as well as of the bearing body. The applicability of the machine is almost unlimited.

The bearing body has trunnions 7 at right angles to the spindle 2 and the lower portion of the fork 3 is constructed in the form of a slide 8. This slide can be moved by a screw spindle 13 which passes through a lug 14 connected to the slide 8. By means of the screw spindle 13 the axial position of a tool connected to the spindle is corrected. The slide 8 is supported on a cylindrical stud 5 with a threaded boring for a screw spindle 11 which can be turned by aid of a hand wheel 10. As a result the stud 5 can be raised and lowered and kept at the desired level by one or several screws 12. The stud 5 can further be turned in the base 9. Over the machine and in front of every one of the four sides a table 21 for the workpiece is arranged. In Fig. 3 only one of these four tables is shown by dotted lines. Instead of the four tables in front of the machine there can also be arranged a table 21 in form of a circular ring quite surrounding the machine. This table 21 has below a cylindrical part 15 surrounding the base 9. In this way the table 21 can be raised and lowered and is kept at the desired level by a screw 16.

It is an advantage to be able to let the motor-driven tool spindle be swingable so that it can work in connection with several different work tables. By considering the device shown on Figure 3 it will be seen that on the base 9 four different work tables can be placed, one to the right, one to the left, one in front and one behind the base. On each of these work tables can be screwed different guides or the like which can act as guides for the work pieces. If for instance parqueted floor sticks have to be made, one operation can be made on one table, another operation on a second table, a third operation on a third table and so on without it being necessary to alter place of guides on the work tables. It is thus possible to finish one operation on a certain number of pieces and then do the next operation and so on.

In the construction shown on Fig. 1, three work tables can be used one on each side of the base 9 and one above the motor. The construction shown on Fig. 2 can also be made co-operative with four work tables.

Having now particularly described my invention, what I claim as new and desire to secure by Letters Patent is:

1. A wood working machine of the character described, including a main supporting base, a spindle mounted for vertical adjustment in the base, a fork supported on the upper end of the spindle, a motor having a driving shaft adapted to removably receive wood working tools and provided with trunnions arranged in a plane at right angles to the longitudinal axis of the driving shaft of the motor, and rockably engaged in the fork so as to support the motor, substantially as and for the purposes set forth.

2. A wood working machine of the character described, including a vertically disposed hollow base, the upper portion of which is enlarged and extended outwardly to form a workpiece supporting table, a spindle mounted for vertical sliding movement in the hollow portion of the base, an operating screw mounted in the base and engaged with the spindle to adjust the spindle, means for clamping the spindle in the desired position of adjustment, a fork having bearings and constructed as a slide for transverse movement in the upper end of the spindle, means for controlling the adjustment of the slide, a motor having trunnions mounted in the bearings of the fork and having its driving shaft arranged at right angles to the bearings and adapted to removably receive wood working tools, substantially as and for the purposes set forth.

In testimony whereof I affix my signature.

WILHELM THURE AUBERTIN.